United States Patent [19]

Parsonage

[11] Patent Number: 4,819,363
[45] Date of Patent: Apr. 11, 1989

[54] FISHING PLUG WITH TREBLE HOOK STORAGE SLOT

[76] Inventor: Ronald K. Parsonage, P.O. Box 234, Lot 115 N. Park Lake, South Bend, Nebr. 68058

[21] Appl. No.: 937,995

[22] Filed: Dec. 4, 1986

[51] Int. Cl.⁴ .............................................. A01K 85/00
[52] U.S. Cl. ...................................... 43/42.4; 43/42.41
[58] Field of Search ..................... 43/42.41, 42.4, 42.1, 43/42.44, 57.1

[56] References Cited

U.S. PATENT DOCUMENTS

| 1,232,804 | 7/1917 | Jamison . | |
| 2,288,009 | 6/1942 | Matasu | 43/42.4 |
| 2,502,577 | 4/1950 | Matasu | 43/42.4 |
| 2,518,238 | 8/1950 | Keeler | 43/39 |
| 2,597,035 | 5/1952 | Rickard | 43/42.4 |
| 2,746,200 | 5/1956 | Dale | 43/42.04 |
| 2,793,459 | 5/1957 | Multanen | 43/42.04 |
| 2,994,982 | 8/1961 | Murawski | 43/35 |
| 3,226,874 | 1/1966 | Boyd | 43/42.4 |
| 4,064,646 | 12/1977 | Vercellone et al. | 43/42.41 |
| 4,143,478 | 3/1979 | Nicholas et al. | 43/42.1 |

OTHER PUBLICATIONS

Katch King Lures, Field and Stream, Feb. 1957, p. 105.

Primary Examiner—Kurt Rowan
Attorney, Agent, or Firm—Zarley, McKee, Thomte, Voorhees & Sease

[57] ABSTRACT

A fishing plug having one or more treble hooks pivotally suspended from a plug body includes an elongated hook storage slot of a size and location for receiving one hook portion of a treble hook upon rotation of the hook shank to align the one hook portion with the slot and upon pivotal movement of the aligned hook portion toward the plug body and into the slot for releasable securement therein.

10 Claims, 1 Drawing Sheet

FISHING PLUG WITH TREBLE HOOK STORAGE SLOT

BACKGROUND OF THE INVENTION

The present invention is directed generally to a fishing plug and more particularly to an improved plug having a slot in the plug body for releasably receiving one hook portion of one, two or three treble hooks for space-efficient, tangle-free storage.

Fishermen typically carry many sizes and types of hooks, jigs, plugs and other artificial bait in an effort to have at hand the optimum lure for each fishing situation they encounter. Plugs of the type having one or more treble hooks pivotally suspended from a plug body cause storage problems because they take up a lot of room in the tackle box and tend to become tangled together. This contributes to inability to keep treble hooks from overlapping drawer separators, exceeding drawer heights and causing difficulties in closing the tackle box. Such tangling also contributes to disorder in the tackle box and makes it difficult to remove any individual plug, particularly when holding a rod or other gear so that only one hand is available for picking up the tangled plug.

The common solution in the prior art is to provide a tackle box with separate individual compartments for each plug. Whereas this affords, in part, an orderly solution, subject to the above-described shortcomings, it limits the number of plugs that can be conveniently carried or results in a tackle box of undue size.

Accordingly, a primary object of the invention is to provide an improved fishing plug which requires less storage room.

Another object is to provide an improved fishing plug with means for releasably securing one or more treble hooks in stationary storage positions.

Another object is to provide an improved fishing plug having a slotted body for releasably receiving a hook portion of one or more treble hooks, thereby to reduce the size of the plug for storage and resist tangling of adjacent hooks.

Another object is to provide an improved fishing plug having a slotted body for releasably receiving a hook portion of one or more treble hooks, thereby to reduce the potential of treble hooks overlapping tray compartment edges and hampering the closing of the tackle box.

Another object is to provide an improved fishing plug having a slotted body for releasably receiving a hook portion of one or more treble hooks, thereby permitting the tying on of a lure without the interference of the loose treble hooks so as to stick the fisherman or tangle in the knot being made.

Another object is to provide an improved fishing plug having a slotted body for releasably receiving a hook portion of one or more treble hooks, thereby permitting the storage of loose treble hooks when removing the remaining hooks from fish so as to not rehook the fish or stick the fisherman.

Another object is to provide an improved fishing plug which is simple in construction, economical to manufacture and efficient in operation.

SUMMARY OF THE INVENTION

The improved fishing plug of the present invention includes an elongated plug body having one or more treble hooks pivotally suspended therefrom and at least one slot formed in the plug body at a position for receiving one hook portion of at least one treble hook upon rotation of the treble hook shank to align one hook portion with the slot and upon pivotal movement of the aligned hook portion toward the plug body and into the slot. Means are provided for releasably securing the hook portion in the slot. A preferred means is to simply provide a hook storage slot of a width such that the hook portion is frictionally received therein.

The slot typically opens through the underside of the plug body and may extend vertically into the plug body or at an inclination for resistance to removal of a hook portion from the slot. A single slot extending between two treble hooks may have end walls which diverge inwardly of the plug body and away from one another to further facilitate retention of the inserted hook portions within the slot.

The exposed tips of the remaining two hook portions of a treble hook may be blunted by a protective member of a penetrable material adapted to be press fit onto the tips of the exposed hook portions. The protective cover may be shaped to conform to the surface of the plug body to facilitate uniform and positive positioning of the cover thereon.

The improved fishing plugs of the present invention take up less room in the tackle box due to the secure storage of the treble hooks closely adjacent the plug bodies and partially inserted therein. Furthermore, several of the improved fishing plugs may be stored in the tackle box in close association without becoming tangled together. This latter feature is further enhanced by the use of optional protective covers for the exposed hook portions of the treble hooks.

DESCRIPTION OF THE PREFERRED EMBODIMENTS

Figure 1:
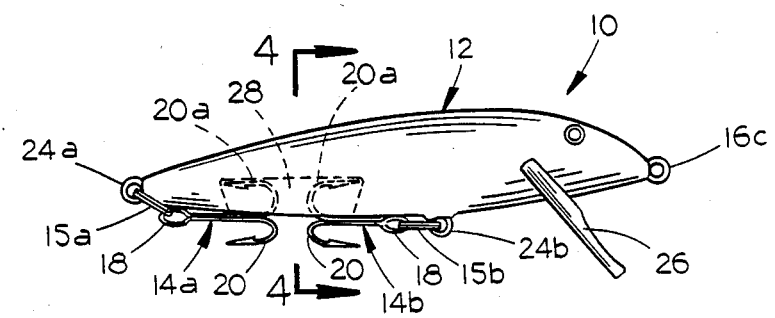
FIG. 1 is a side elevational view of the fishing plug of the invention with dotted lines indicating hidden portions thereof.

The improved fishing plug 10 of the present invention is shown in the drawings as including an elongated plug body 12 and a pair of treble hooks 14a and 14b pivotally suspended from respective eyelets 16a and 16b on the rearward end and underside of the plug body respectively. Ring connectors 15a and 15b connect the treble hook to the eyelet for free swinging movement of the treble hooks toward and away from the plug body and with at least limited freedom of rotation of the shank 16. Each treble hook 14 includes a relatively straight shank 16 terminating in a fastening loop 18 at one end and three arcuate hook portions 20 at the opposite end. The hook portions extend outwardly in circumferentially spaced apart relation and terminate in sharp points or tips 22. Another eyelet 24 is secured at the forward end of the plug body for connection to a fishing line. A deflector 26 extends forwardly and outwardly from the underside of the plug body adjacent the forward end thereof for controlling movement of the plug through the water. The fishing plug, as thus far described, is of conventional construction.

Figure 2:
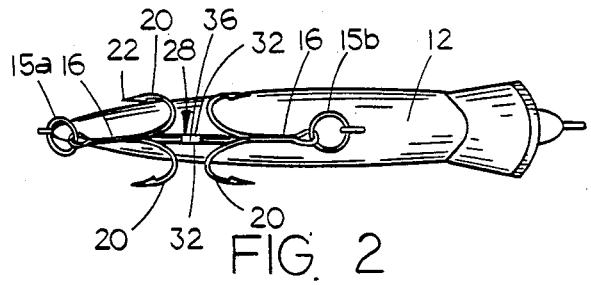
FIG. 2 is a bottom view of the plug.

The improvement presented by the present invention is directed to an elongated hook storage slot 28 formed in the underside of the plug body along a line extending between treble hook mounting eyelets 24a and 24b. The slot 28 is of a size and locations for receiving one hook portion 20a of each treble hook 14a and 14b upon rotation of the shank 16 of each hook to align the respective hook portion 20a with the slot 28 and upon pivotal movement of the aligned hook portion 20a toward the plug body 12 and into the slot 28 as illustrated in FIGS. 1 and 2. To releasably secure each hook portion 20a within the slot 28, the slot is preferably of a sufficiently narrow width that the hook portions 20a are frictionally received therein.

For lures made of plastic or any other moldable material, the slot may be made as a part of the lure when it is produced by an injection molding process.

Figure 3:
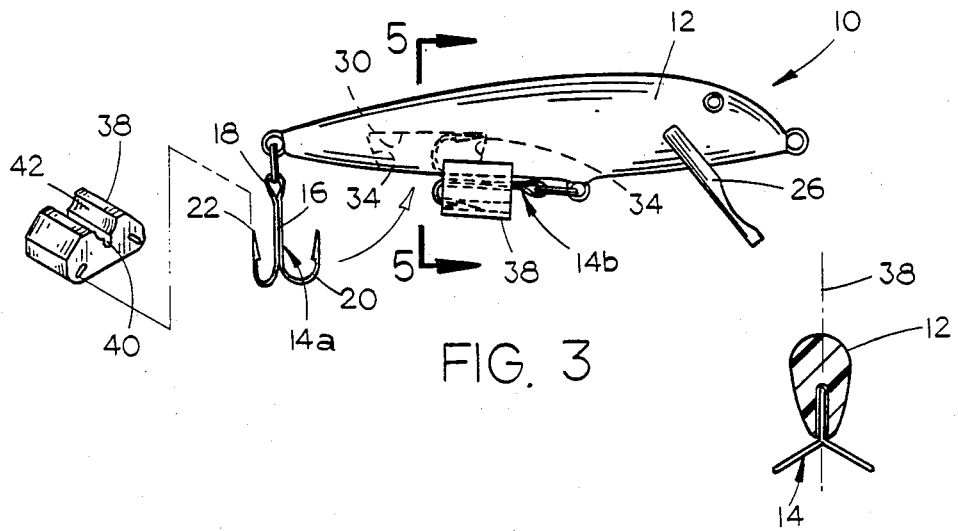
FIG. 3 is a side elevational view of the plug with a protective cover shown detached from one treble hook.

The slot 28 may be sealed with silicone, any normal exterior finish or the like to protect the surfaces, herein referred to as bottom wall 30, elongated side walls 32 and opposite end walls 34. The end walls 34 may diverge inwardly of the plug body and away from one another as illustrated in FIGS. 1 and 3 such that the length of the slot 28 at a depth within the plug body 12 exceeds the length of the opening 36 through the underside of the plug body. The end walls are preferably positioned relative to the hook eyelets 24a and 24b such that the treble hook must be extended full length toward the slot to accommodate passage of the hook portion tip 22 into the opening 36. As a result, engagement between the hook portions 20 and end wall 34 further facilitate retention of the hook portions within the slot 28. Pivotal movement of the shank and the natural resilience of the hook portion and ring connectors enables the hook portions 20a to be easily manipulated into and from the slot 28.

As illustrated in the drawings, the length of slot 28 substantially exceeds its width which is approximately equal to the thickness of a single hook portion. The depth of slot 28 is substantially equal to the perpendicular distance between the shank 16 and tip 22 of a hook portion 20 such that the hook portion may be inserted to the extent of engagement of the shank against the underside of the plug body.

Figure 4:
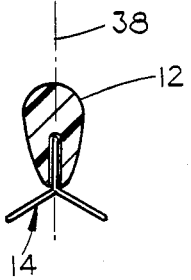
FIG. 4 is a sectional view taken along line 4—4 in FIG. 1.
Figure 6:
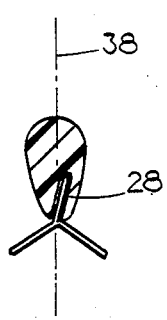
FIG. 6 is a sectional view of an alternate embodiment showing an inclined slot in the plug body.
Figure 5:
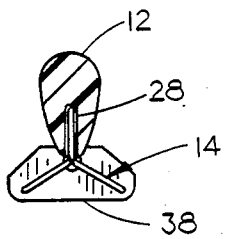
FIG. 5 is a sectional view taken along line 5—5 in FIG. 3.

Whereas the hook portions are easily press fit into the slot by hand, they are unlikely to enter the slot during normal swimming movements when the plug is in use. This is because the treble hooks are typically formed in such a way that the junction between two hook portions faces the underside of the plug body. Accordingly, the shank has to be rotated 60 degrees to align a hook portion with the slot. Secondly, the relatively narrow width of the slot relative to the hook portions blocks accidental entry of a hook portion. Further assurance against accidental entry of a hook portion into the slot can be provided by forming a slot which is inclined relative to a vertical plane through the plug body as illustrated in FIG. 6. This is contrasted with the embodiment of FIG. 4 wherein the slot 28 is situated so as to be bisected by a transversely centered longitudinally extending vertical plane 38 through the plug body.

It can be seen in the drawings that the plug will occupy less space upon insertion of one hook portion of each treble hook into the hook storage slot. To further eliminate the exposure of the remaining hook portions, an exposed hook protector or cover 38 may be provided of a penetrable material and of sufficient width to be press fit onto the two exposed hook portions of a treble hook in its storage position. Hook protector 38 (FIG. 3) is formed with a central groove 40 to accommodate receipt of the hook shank 16 therein and a wider recess 42 which is adapted to conform to the underside of the plug body 12 to facilitate uniform positive placement of the cover onto each treble hook. The hook protector may be made of balsa wood, styrofoam, rubber or any suitable penetrable material which will stand up to repeated use.

It is understood that the hook storage slot 28 of the present invention may be formed in a plug body at the time of its original manufacture or existing plug bodies may be modified in accordance with the present invention by cutting or otherwise forming a hook storage slot therein.

Whereas the invention has been shown and described in connection with the preferred embodiments thereof, it will be understood that many modifications, substitutions and additions may be made which are within the intended broad scope of the appended claims. For example, separate hook storage slots may be provided to accommodate individual treble hooks or to hold two treble hooks facing each other. Likewise, whereas the placement of the slot at the underside of the plug body is preferred because of the conventional mounting of a treble hook at that location, the slot could otherwise be formed through any surface of the plug body.

Thus there has been shown and described an improved fishing plug which accomplishes at least all of the stated objects.

I claim:

1. In a fishing plug including an elongated plug body and at least one treble hook having a central shank and three arcuate hook portions extending outwardly from said shank; said treble hook being pivotally suspended from the plug body for free swinging movement toward and away from said plug body and with at least limited freedom of rotation of the shank, the improvement comprising,
    an elongated hook storage slot in the bottom side of said plug body,
    said slot being of a size and location for receiving one hook portion of said treble hook upon rotation of the shank to align said one hook portion with said slot and upon pivotal movement of the aligned hook portion toward said plug body and into said slot, and
    means for releasably securing said hook in said slot, said slot defining an opening through a surface of the plug body, said opening being substantially linear, the length of said opening substantially exceeding the width thereof and the depth of said slot being substantially equal to the perpendicular distance between the shank and tip of said one hook portion.

2. The improvement of claim 1 wherein said means for releasably securing said hook in said slot comprises the relatively narrow width of said slot for frictionally receiving a hook portion therein.

3. The improvement of claim 2 wherein said slot opens through the underside of said plug body.

4. The improvement of claim 3 wherein said slot is situated so as to be bisected by a transversely centered longitudinally extending vertical plane through said plug body.

5. In a fishing plug including an elongated plug body and at least one treble hook having a central shank and three arcuate hook portions extending outwardly from said shank, said treble hook being pivotally suspended from the plug body for free swinging movement toward and away from said plug body and with at least limited freedom of rotation of the shank, the improvement comprising, an elongated hook storage slot in said plug body, said slot being of a size and location for receiving one hook portion of said treble hook upon rotation of the shank to align said one hook portion with said slot and upon pivotal movement of the aligned hook portion toward said plug body and into said slot, means for releasably securing said hook in said slot, the length of said opening substantially exceeding the width thereof, and said fishing plug including a second treble hook pivotally connected to the plug body in longitudinally spaced relation from the aforementioned treble hook, said slot being positioned longitudinally between said treble hook and being of sufficient length for receiving an arcuate hook portion of each hook.

6. The improvement of claim 5 wherein said slot is defined by a bottom wall, elongated opposite side walls and opposite end walls, said end walls diverging inwardly of the plug body and away from one another whereby the length of the slot at a depth within said plug body exceeds the length of said opening.

7. The improvement of claim 1 wherein said slot is inclined relative to a vertical plane for resistance to removal of a hook portion from the slot.

8. In a fishing plug including an elongated plug body and at least one treble hook having a central shank and three arcuate hook portions extending outward from said shank, said treble hook being pivotally suspended from the plug body for free swinging movement toward and away from said plug body and with at least limited freedom of rotation of the shank, the improvement comprising, an elongated hook storage slot in said plug body, said slot being of a size and location for receiving one hook portion of said treble hook upon rotation of the shank to align said one hook portion with said slot and upon pivotal movement of the aligned hook portion toward said plug body and into said slot, means for releasably securing said hook in said slot, and an exposed hook protector of a penetrable material and of sufficient width to be press fit onto the two exposed hook portions of a treble hook having said one hook portion secured in said slot.

9. The improvement of claim 8 wherein said exposed hook protector has an underside of a shape to conform to the exterior surface of said plug body adjacent said slot.

10. A method for modifying a fishing plug including an elongated plug body and at least one treble hook having a central shank and three arcuate hook portions extending outwardly from said shank, said treble hook being pivotally suspended from the plug body for free swinging movement toward and away from said plug body and with at least limited freedom of rotation of the shank, the method comprising, cutting an elongated hook storage slot in the bottom side of said plug body, such that said slot defines a substantially linear opening through a surface of the plug body, the length of said opening substantially exceeding the width thereof and the depth of said slot being substantially equal to the perpendicular distance between the shank and tip of said one hook portion, positioning said slot for receiving one hook portion of said treble hook upon rotation of the shank to align one hook portion with said slot and upon pivotal movement of the aligned hook portion toward said plug body and into said slot, and releasably securing said hook in said slot.

* * * * *